No. 734,310. PATENTED JULY 21, 1903.
H. F. T. ERBEN.
COIL FOR DYNAMO ELECTRIC MACHINES.
APPLICATION FILED APR. 19, 1902.
NO MODEL.

Witnesses.
Erving R. Gurney.
Helen Orford.

Inventor.
Hermann F. T. Erben.
by Albert G. Davis
Atty.

No. 734,310. Patented July 21, 1903.

UNITED STATES PATENT OFFICE.

HERMANN F. T. ERBEN, OF SCHENECTADY, NEW YORK, ASSIGNOR TO GENERAL ELECTRIC COMPANY, A CORPORATION OF NEW YORK.

COIL FOR DYNAMO-ELECTRIC MACHINES.

SPECIFICATION forming part of Letters Patent No. 734,310, dated July 21, 1903.

Application filed April 19, 1902. Serial No. 103,698. (No model.)

*To all whom it may concern:*

Be it known that I, HERMANN F. T. ERBEN, a citizen of the United States, residing at Schenectady, county of Schenectady, State of New York, have invented certain new and useful Improvements in Coils for Dynamo-Electric Machines, of which the following is a specification.

This invention relates to a method of making heavy field-coils for dynamo-electric machines, such as the series coils for compound-wound motors and generators. The coil which is produced consists of a plurality of parallel layers of a flat copper conductor wound edgewise, the layers making one or more turns, as determined by the design of the machine, and connected in series or in parallel, as the case demands. If connected in parallel, the coil is, in effect, the same as a solid bar having the same cross-section as the combined layers; but it has been found that the mechanical difficulties involved in winding a solid bar of large cross-section practically prohibits such a construction. In winding a coil composed of a plurality of parallel strips of small size the several strips might be wound simultaneously, each being run through its own tension device; but for large coils this is impracticable, owing to the difficulty of obtaining a winding-machine sufficiently strong to bend all at once the full section of copper. My invention obviates this trouble, permitting the several layers to be wound successively.

The invention consists in forming the requisite number of convolutions or layers of metal separately, assembling them side by side in parallel relation, and securing their adjacent ends to suitable terminals. I prefer to use a flat-sided conductor, such as a flat strip, of considerably greater width than thickness and of even dimensions throughout. To form the separate convolutions, I prefer to wind such a strip edgewise into a helical coil of a large number of turns, then cut the coil into lengths, and then interweave the lengths by screwing them together until they all lie parallel with their ends flush. The ends of the layers are then soldered together and to a terminal of proper cross-section. If a greater cross-section of coil is desired, a second coil of smaller or greater diameter can be similarly constructed and slipped inside or outside of the other, the terminals of the two being connected in parallel.

Figure 1:
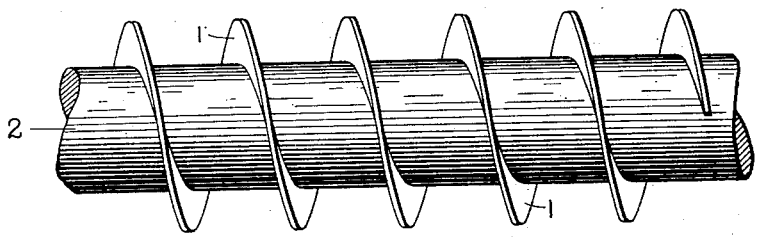
Figure 2:
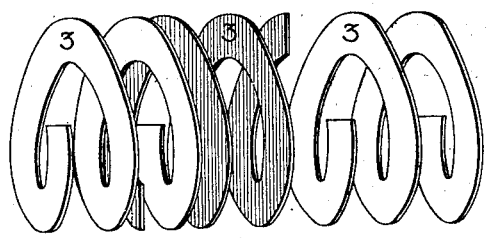
Figure 3:
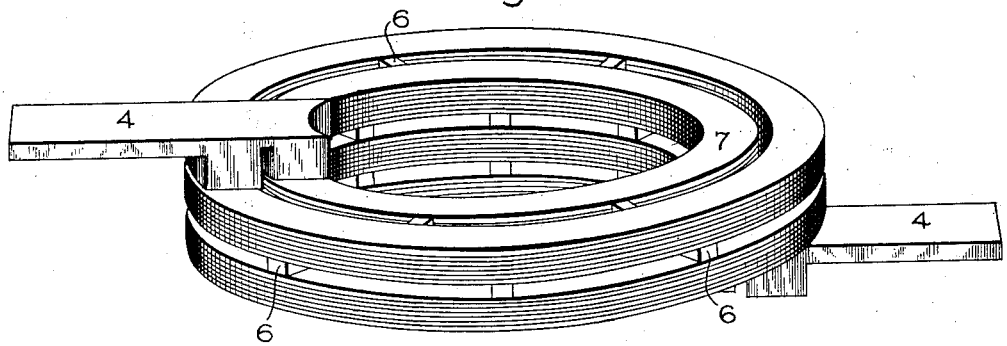
Figure 4:
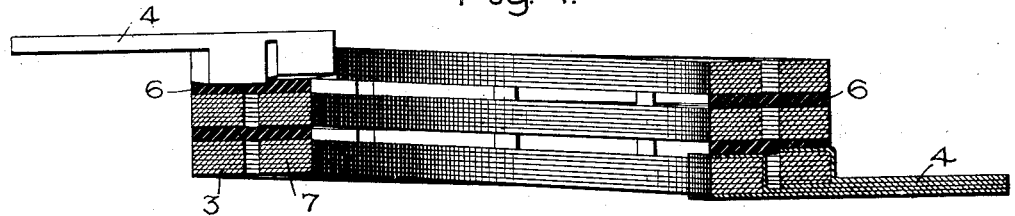

In the accompanying drawings, Figure 1 is a diagrammatic view showing a flat conductor coiled into a helix. Fig. 2 is a perspective view illustrating my invention and showing three layers of the coil, two of them being partly interwoven. Fig. 3 is a perspective view of a coil made by my method. Fig. 4 is a diametrical cross-section of the same.

In carrying out my process a conductor 1, preferably a flat-sided strip of copper, is wound edgewise on a suitable former 2 into a long helix, which is preferably, though not necessarily, cylindrical. The number of convolutions in the helix is determined by the number of parallel layers which will compose the finished coil and the number of turns each layer will have. Thus if the coil is to have seven layers and each layer is to make two and a half turns, as shown in Fig. 3, the helix will be wound with seventeen and a half turns. The helix is then cut into seven lengths 3 of two and a half turns each, and the several lengths are then interwoven, as indicated in Fig. 2, one after another being screwed into parallelism with the others until their ends are all flush. If the several layers are to be connected in series, they must be insulated from each other and properly connected at the ends; but if, as is most likely, they are to be all in parallel the ends will all be soldered together and to a heavy terminal 4 of equivalent cross-section to the multiple coil. If desired, the several turns may be separated by space-blocks 6 to insure good ventilation, though as a rule the heavy copper of which the coils are made is stiff enough to maintain the spaces between the turns without any separators. In addition to the spaces between the turns there is more or less of a circulation of air between the layers, so that the coil is easily kept cool. To increase the cross-section of the coil without using a wider strip or more layers, a second coil 7 may be made in the same way and slipped inside or outside of the first coil, the terminals of the two coils being united to place them in parallel. If the finished coil is to have only one turn, the requisite number of convolutions or layers are readily assembled side by side in parallel relation without screwing them together.

What I claim as new, and desire to secure by Letters Patent of the United States, is—

1. The method of making a coil for a dynamo-electric machine, which consists in assembling side by side a plurality of separate layers of a flat conductor, and connecting their adjacent ends to a suitable terminal.

2. The method of making a coil for a dynamo-electric machine, which consists in forming a plurality of convolutions of metal, assembling them side by side, and connecting their adjacent ends.

3. The method of making a coil for a dynamo-electric machine, which consists in forming a plurality of flat helical convolutions of metal, assembling them in close parallel relation, and providing their adjacent ends with terminals.

4. The method of making a coil for a dynamo-electric machine, which consists in winding a conductor into a helix, cutting said helix into lengths, and assembling said lengths.

5. The method of making a coil for a dynamo-electric machine, which consists in winding a flat-sided conductor into a helix, cutting said helix into lengths, and interweaving said lengths.

6. The method of making a coil for a dynamo-electric machine, which consists in winding a flat conductor edgewise into a helix, cutting said helix into lengths, and interweaving said lengths.

7. The method of making a coil for a dynamo-electric machine, which consists in forming two sets of helical lengths of a conductor, of different diameters, interweaving similar lengths so as to form two coil-sections of different diameters, placing one inside the other, and connecting the adjacent ends of said sections.

In witness whereof I have hereunto set my hand this 17th day of April, 1902.

HERMANN F. T. ERBEN.

Witnesses:
BENJAMIN B. HULL,
HELEN ORFORD.